July 25, 1944.　　M. WATTER ET AL　　2,354,236
AIRCRAFT WING MOUNTING MEANS
Filed March 6, 1943　　4 Sheets-Sheet 1

INVENTORS.
Michael Watter
Harry J. Scammell
BY
ATTORNEY

INVENTORS.
Michael Watter
Harry J. Scammell.
BY
ATTORNEY

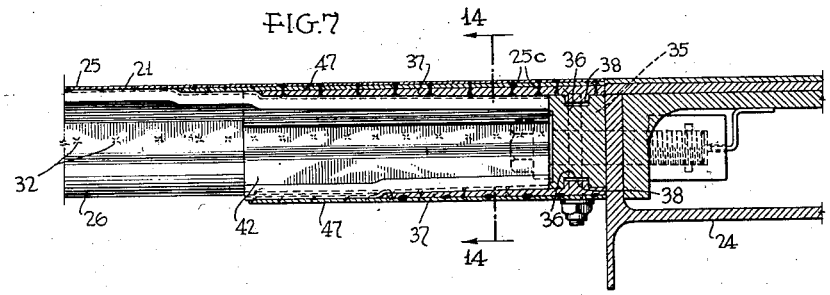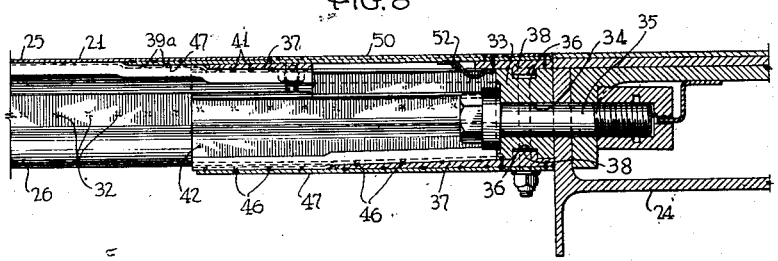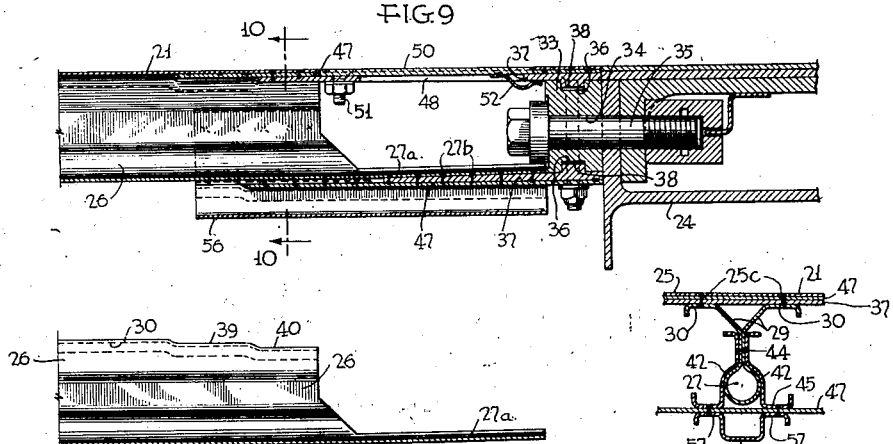

July 25, 1944.  M. WATTER ET AL  2,354,236
AIRCRAFT WING MOUNTING MEANS
Filed March 6, 1943  4 Sheets-Sheet 4

INVENTORS
Michael Watter
Harry J. Scammell
BY
ATTORNEY

Patented July 25, 1944

2,354,236

UNITED STATES PATENT OFFICE 2,354,236

AIRCRAFT WING MOUNTING MEANS

Michael Watter and Harry J. Scammell, Philadelphia, Pa., assignors to Edward G. Budd Manufacturing Co., Philadelphia, Pa., a corporation of Pennsylvania Application March 6, 1943, Serial No. 478,229

20 Claims. (Cl. 244—123)

This invention relates to wings for aircraft, more particularly to means for attaching the inboard ends thereof to adjacent wing or fuselage sections.

The invention is especially applicable to aircraft wing structures of the stressed skin type having spanwise extending reinforcing stringers wherein the compression and tension stresses must be transferred into the adjacent structure through the attaching means.

The primary object of the invention is to provide an inboard end attaching means for aircraft wings of the stressed skin type which is of high strength but light in weight and of such construction as to provide for convenient access to attaching bolts and the like employed for rigidly connecting the same to the adjacent structure.

Another object is to provide a wing end attaching means of a construction which is particularly applicable to stringer-reinforced metallic skins for permanent connection therewith, as by spot welding, and which when so connected provides for efficient transfer of the wing stresses to the adjacent structure.

A further object of the invention is to provide a light weight wing end attaching means of such construction as to be readily associated with skin reinforcing stringers of the bulb-section type and at the same time provide for the convenient use of attaching bolts disposable between the stringers for attaching the wing to the adjacent wing or fuselage section.

With the above and other objects in view, the present invention consists in certain features of construction and combinations of parts to be hereinafter described with reference to the accompanying drawings, and then claimed.

In the drawings which show a suitable embodiment of the invention for the purpose of illustration:

Figure 1:
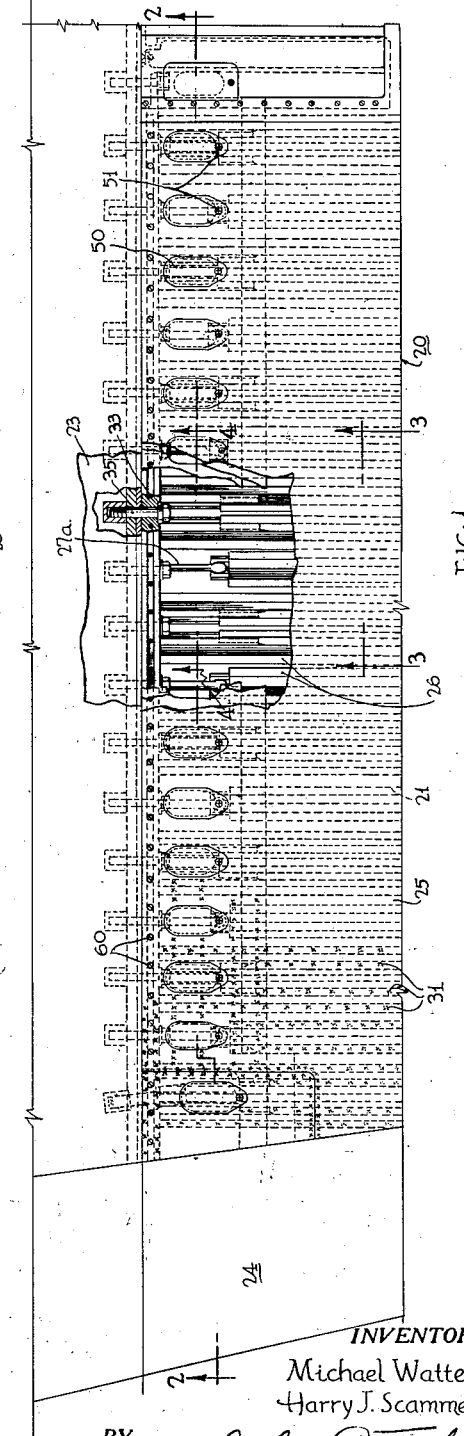
Fig. 1 is a fragmentary plan view of the inboard end of a stressed skin aircraft wing having the attaching means of the present invention incorporated therein, the trailing non-load carrying section being omitted, and a portion of the skin being broken away.
Figure 4:
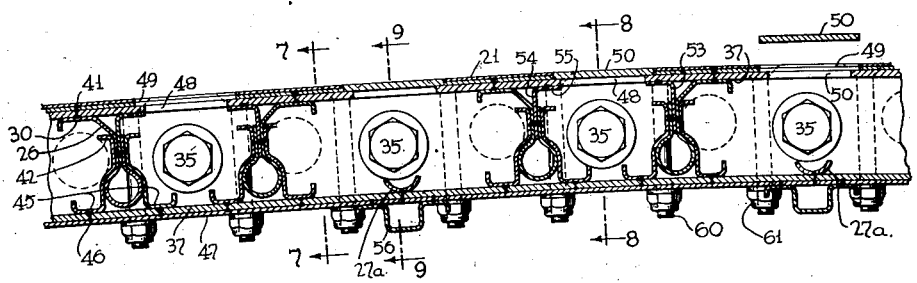
Fig. 4 is an enlarged section taken approximately on line 4—4 of Fig. 1 through the top skin blanket only and adjacent the inboard end of the wing.
Figure 5:
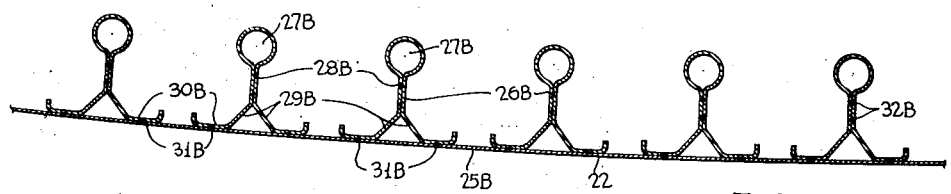
Figs. 5 and 6 are enlarged sections through the bottom skin blanket taken at regions corresponding to those at which Figs. 3 and 4, respectively, were taken.
Figure 14:
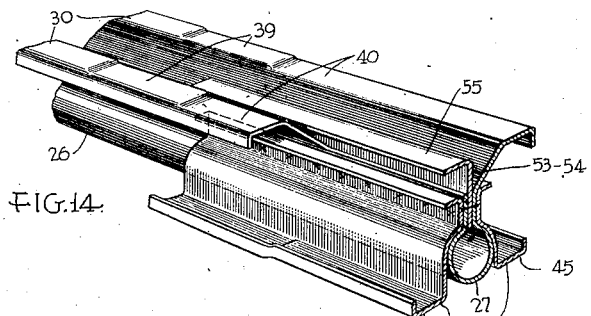
Figure 16:
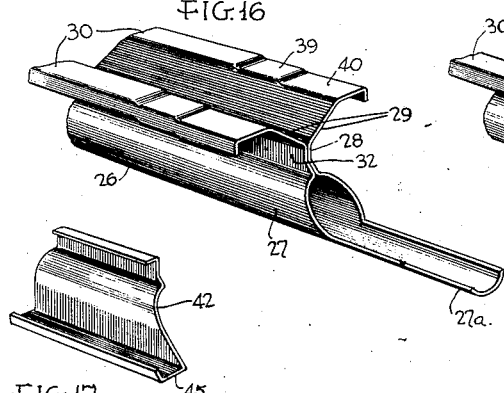
Figure 15:
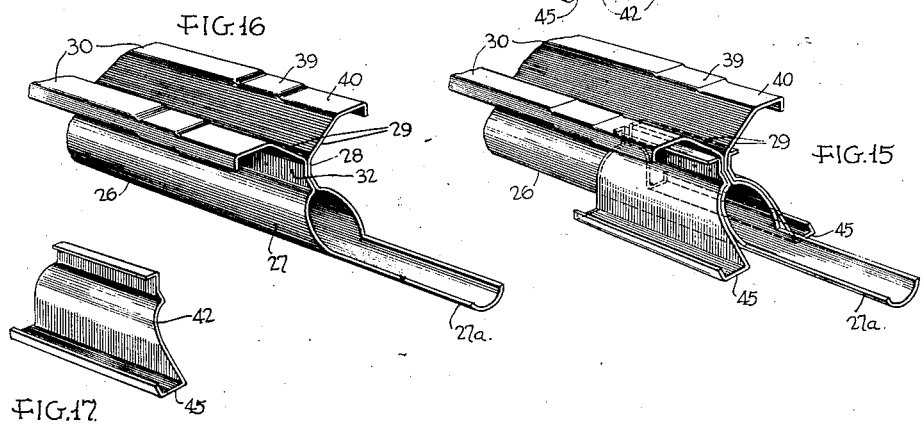
Figure 17:
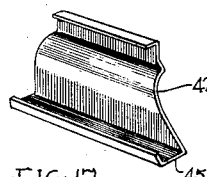
Figure 13:
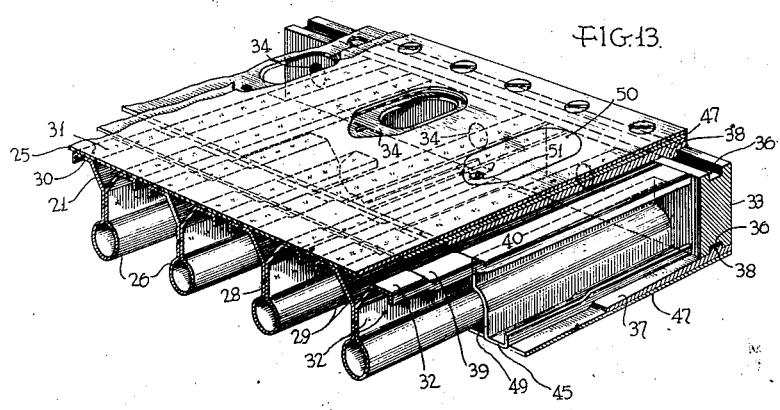

Figs. 7, 8 and 9 are longitudinal sections taken on lines 7—7, 8—8 and 9—9, respectively, of Fig. 4;

Fig. 10 is a transverse section taken on line 10—10 of Fig. 9;

Fig. 11 is a side elevation of the end of the skin reinforcing stringer of Figs. 9 and 10;

Fig. 12 is a side elevation of a supplemental stringer reinforcement associated with the end of the stringer shown in Figs. 9 and 10;

Fig. 13 is a fragmentary sectional perspective view of the top skin blanket taken substantially at the line 3—3 of Fig. 1 as looking toward the end of the wing;

Fig. 14 is a perspective section view of the stringer portion shown in Fig. 7 and taken approximately at line 14—14 of Fig. 7 as looking away from the inboard end; and Figs. 15, 16 and 17 are perspective views of the stringer and supplemental portions shown in Figs. 9 to 12 inclusive, Fig. 15 showing the parts assembled and Figs. 16 and 17 showing the same parts dis-assembled.

Referring to the accompanying drawings in which like numerals refer to like parts throughout the several views, only the nose and load carrying portion of the wing 20 selected for illustration are shown, the ribs, the spar and trailing section being omitted for the sake of clarity of illustration. The attaching means of the present invention is directly associated with the top and bottom skin blankets 21 and 22 respectively, for transferring the stresses from these blankets substantially in the planes thereof into the adjacent wing or fuselage section 23 to which the wing is attached. The leading edge section or nose portion 24 of the wing 20 is merely illustrated in Figs. 1 and 2 to show the general wing contour up to the trailing edge of the main load carrying portion of the wing, that is, the skin blankets 21 and 22.

The wing 20 is of the stressed skin type, the blankets 21 and 22 each being comprised of a sheet metal skin 25 reinforced by spanwise extending stringers 26.

In the following description, the top skin blanket 21 will be dealt with mainly, it being understood that the bottom blanket 22 is correspondingly constructed. In the views showing the bottom blanket, those parts which correspond to parts in the top blanket carry the same number as the top blanket parts, but such numbers are followed by the letter "B" to designate that the designated part belongs to the bottom blanket.

Figure 3:
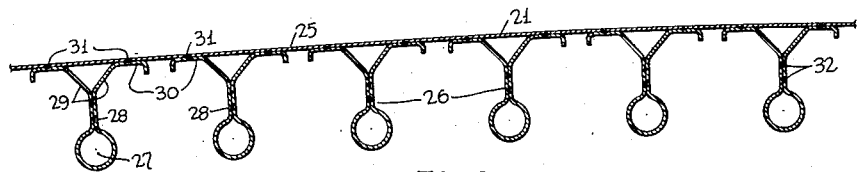
Fig. 3 is an enlarged section taken approximately on line 3—3 of Fig. 1, but of the top skin blanket only, showing the cross sectional shape of the skin reinforcing stringers.

The skin reinforcing stringers 26 as shown in Figs. 1 and 3 are regularly spaced, and each is generally of Y-shaped cross section to provide a bulb or tubular base 27, an integral web 28 and integral Y-arms 29 diverging from the web 28 and terminating in opposed marginal skin attaching flanges 30. The marginal flanges 30 are regularly spot welded throughout their longitudinal extent to the skin sheet 25 as indicated by the spot welding designations 31. These stringers as here shown are of a single piece sheet metal construction, and being formed from a single sheet of metal, such as for example, stainless steel, formed upon itself from a median line to constitute the symmetrical cross-section just described, the portions constituting the web 28 which interconnect the bulb 27 and arms 29, being spot welded together at desired longitudinal intervals as indicated at 32. The stringers 26, however, may be formed of a plurality of pieces of sheet metal, instead of a single sheet, to constitute a similar cross sectional shape, and, moreover, they may have any other suitable shape.

The attaching means for each of the skin blankets embodies a generally rectangular shaped attaching plate or bar 33 shaped to the contour of the blanket to which it is attached and extending from the leading to the trailing edges of the blanket and provided with regularly spaced bolt openings 34 through which the securing bolts 35 extend for mounting the wing 20 upon the adjoining wing or fuselage section 23. The bar 33 is preferably of light weight, high strength aluminum alloy.

The present invention is especially directed to an efficient high strength means for connecting each bar 33 with opposite sides of its skin blanket so that the stresses in the blanket will be distributed into the bar in spaced generally parallel paths substantially in the planes of the upper and lower sides of the blanket. To this end, the opposite top and bottom faces of the bar 33 are formed with longitudinally extending, outwardly facing keying slots or recesses 36. Associated with these faces are overlapping clamping plates 37 preferably of high strength metal, such as stainless steel, the bar being disposed between the plates 37 and the plates having integral projecting key portions 38 fitting, preferably with a press fit, into the adjacent recesses 36.

The plates 37 receive the inboard ends of the stringers 26 therebetween as shown in the drawings, particularly in Figs. 4 and 13. Covering the plates 37 are reinforcing sheets or plates 47, preferably of stainless steel, the plates 47 being of greater width than the plates 37 and thereby projecting in an outboard direction beyond the plates 37 as seen in Figs. 7, 8, 9 and 13. The ends of the stringer flanges 30 are doubly offset or stepped in the direction of the bulb portions 27 to provide intermediate step faces 39 and end step faces 40. The outer plate 37 overlaps the stringer ends and is seated on the end step faces 40 and spot welded thereto, as indicated at 41 in Figs. 4 and 8. The outer plate 47 is seated on the intermediate step faces 39 of the stringer ends and is spot welded thereto, as indicated at 39a in Fig. 8. The skin 25 extends over the plate 47 and is spot welded with the plate 47 to the plate 37, as indicated by the spot welding designations 25c of Fig. 7, and with the plates 37 and 47 to the stringer flanges 30, as indicated by the spot welding designations 25c of Fig. 10.

In order to efficiently secure the inner plates 37 and 47 to the stringers 26, the stringers are provided at their opposite sides with reinforcing sheet metal channel sections 42. As shown in Fig. 10, the web portions 44 of the channel sections 42 are spot welded to the stringer webs 28 and for the remainder of their depth are contoured to the shape of stringer bulb 27 and terminate in lateral, oppositely extending flanges 45 corresponding to the stringer flanges 30. The inner plate 37 and inner reinforcing plate 47 overlie these flanges 45 and are spot welded thereto, as indicated at 46 in Figs. 4 and 8, as in the case of the outer plates and stringer flanges 30.

Figure 2:
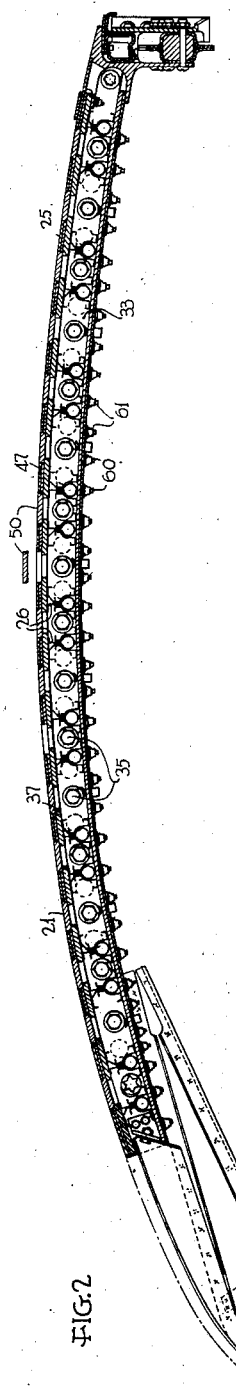
Fig. 2 is a transverse section taken substantially on line 2—2 of Fig. 1.

Referring to Figs. 2, 9 and 13, at the region of each bolt opening 34 and adjacent the bar 33, the outer plate 37 is formed with an access slot 48, the skin 25 and outer plate 47 also being provided with a corresponding but larger slot 49 so that access may be had externally of the wing through the aligned slots 48 and 49 to the bolts 35. Normally each slot is closed by a closure plate 50 fitting within slot 49, flush with the skin surface and abutting the plate 37. A screw 51 is provided at one end to hold the closure plate 50 in position and at the other end a spring clip 52 engageable with the inner side of the outer plate 37 is spot welded thereto, as shown in Fig. 9. The screw 51 and spring clip 52 securely hold the closure plate 50 in position and yet upon removal of the screw 51 the plate 50 can be easily removed.

Frequently, the spacing of the bolt openings in the bar 33 may be slightly different from that of the stringer spacing and, as will be seen in Fig. 13, the stringer spacing may be such that the flanges 30 thereof are too closely spaced to permit access through the slots 48 and 49 to the bolts 35, or the bolt opening may be nearly directly in line with a stringer as seen in Fig. 4. Accordingly, the stringer ends are modified to permit free access for insertion and removal of the bolts 35 through the slots 48 and 49.

In the case where the bolt opening 34 occurs substantially midway between two stringers, such as indicated at the section line 8—8 of Fig. 4, the end of the stringer at the left of this section line is modified as shown in Figs. 8 and 14. Here, the one flange 30 and arm 29 of the stringer 26 are removed for the longitudinal extent of the adjacent slots 48 and 49, and, in order to compensate for the removal of these portions of the stringer, an angle plate 53 is utilized, the one branch 54 thereof being disposed between the webs 28 and being spot welded thereto with the reinforcing channel sections 45. The other branch 55 of the plate 53 is of the same height as the flange 30 for spot welded attachment to the plate 37, as indicated in Fig. 4, the branch 55 extending substantially to the edge of the adjacent slot 48. The end of the stringer at the other side of the section line 8—8 is similarly modified as shown in Fig. 4.

In the case where the bolt opening 34 is nearly aligned with a stringer as at the section line 9—9 of Fig. 4, a different modification of the stringer end is effected. Here, as shown, it is necessary, in order to provide sufficient space for bolt insertion and removal, that the stringer end be completely cut away for the extent of the slot 48, except for the lower portion 27a of the bulb 27. The lower portion 27a is spot welded, as will be seen in Fig. 9, to the inner plate as indicated at 27b. Also the reinforcing channel sections 42 are cut back as shown in Figs. 15 and 17. In order to further compensate for the loss in strength incident to the removal of the end portion of the stringer, a strengthening hat-shaped section 56 is spot welded through its flanges 57 to the channel section flanges 45 and also to the inner plate 37 through the inner plate 47.

In some instances, it may be desirable to remove both flanges 30 and arms 29 of the stringer ends and replace the same with two angle plates, such as the plates 53, arranged back to back and spot welded to the stringer webs 28. This condition is illustrated in Fig. 6 at the endmost stringer at the left side of the lower blanket illustrated therein.

In the assembly of the attaching means, first the outer plates 37 and 47 are assembled through the use of suitable welding tongs (not shown) by straddling the same from the inboard end, the various flanges being so arranged as to permit free access of the tongs. Thereafter, the key bar 33 is fitted with the key 38 of the outer plate 37 fitting into the recess 36 thereof, and then the inner plates 37 and 47 are assembled and spot welded in place by reaching in between the stringers with the spot welding tongs.

The plates 37 are then rigidly clamped to the bar 33 by a series of bolts 60 (Figs. 1 and 4) having countersunk heads, the bolts 60 extending through the skin sheet 25, the outer plate 47, outer plate 37, and the block 33 and thence through the inner plate 37, and inner plate 47 for the reception of nuts 61 which when tightened securely clamp the block 33 between the plates 37 and provide an extremely rigid construction. In order to insure accurate centering of the bolt holes 34, such holes may be drilled after the bar 33 is secured in position, a suitable drilling template (not shown) being utilized for this purpose.

Figure 6:
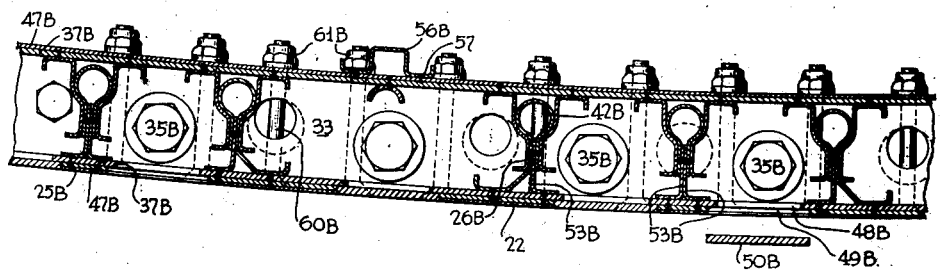

As will be seen in Figs. 4 and 6 the bolts 60 are preferably so arranged that each attaching bolt 35 is disposed between a pair of the bolts 60 whereby the tendency of the plates 37 to separate incident to the cantilever stresses of the wing is resisted by the bolts 60. The keys 38 of the plates 37 together with the bolts provide an extremely effective and efficient means for uniformly distributing the stresses from the skin blanket into the bars 33 and thence through the bolts 35 into the adjoining wing or fuselage section.

By employing the key plates 37 and the channel sections 42 in association with the stringers 26 an extremely effective means is provided for the uniform distribution of the skin blanket stresses through parallel paths to the mounting bar, which means is effective throughout the depth of the skin blanket. Moreover, such a construction facilitates the assembly of the attaching means to the skin blanket particularly when spot welding is utilized as the securing means. It is to be noted also that those parts which are to be secured together are so designed that the spot welds are subject to shear stresses thereby affording a high strength structure. By utilizing reinforcing channel sections 42 in the manner described and interconnecting the same by the plates 37 and 47 spot welded thereto, the stringer ends are securely mounted against transverse flexure relative to each other and the key bar 33, thus enhancing the strength of the structure.

Another advantageous feature is that without decreasing the strength of the attaching means the attaching bolts 35 are so disposed in the structure that free access to the same may be had by the use of suitable wrenches inserted through slots 47 and 48 exteriorly of the wing structure.

While the structure is particularly adaptable for assembly by electric resistance spot welding, it is to be understood that rivets may be utilized in lieu of spot welding.

It will be obvious to those skilled in the art that various changes may be made in the detailed construction and arrangement of parts described without departing from the spirit and substance of the invention, the scope of which is defined by the appended claims.

What is claimed is:

1. The combination in an airfoil of the stressed skin type of opposed skin blankets and wing attaching means, each of said blankets comprising a metallic skin and spanwise extending reinforcing elements of substantial depth secured to said skin internally of the wing, and said attaching means comprising for each of said skin blankets a chordwise extending attaching member adjacent the ends of said reinforcing elements and a pair of spaced stress transfer plates substantially coextensive with the attaching member, said plates being rigidly secured to opposite sides of the reinforcing elements and overlapping the opposite sides of the attaching member, and means rigidly clamping the attaching member between the stress transfer plates.

2. The combination in an airfoil of the stressed skin type of spaced opposed reinforced skin blankets and wing end attaching means for each of said blankets, each of said attaching means comprising a chordwise extending attaching member disposed substantially in the plane of the respective skin blanket adjacent the inboard end thereof and a pair of laterally spaced generally parallel stress transfer plates substantially coextensive with the blanket and the attaching member, said plates being rigidly secured to the inner and outer sides of the skin blanket and receiving the attaching member therebetween, and means for securing the plates to the attaching member.

3. The combination in an airfoil of the stressed skin type of opposed skin blankets and wing attaching means, each of said blankets comprising a metallic skin and spanwise extending reinforcing elements of substantial depth secured to said skin internally of the wing, and said attaching means comprising for each of said skin blankets a chordwise extending attaching member adjacent the ends of said reinforcing elements and a pair of spaced stress transfer plates substantially coextensive with the attaching member, said plates being rigidly secured to opposite sides of the reinforcing elements and overlapping the opposite sides of the attaching member, and means rigidly clamping the attaching member between the stress transfer plates, each plate and the adjacent surface of the attaching member having interfitting tongue and groove portions extending longitudinally of the attaching member.

4. The combination in an aircraft wing of the stressed skin type of a skin blanket and an inboard end blanket attaching means, said blanket comprising a metallic skin and spanwise extending reinforcing means of substantial depth secured thereto internally of the wing, and said attaching means comprising a chordwise extending attaching member disposed adjacent the inboard end of said blanket substantially in the plane thereof, spaced metallic stress transfer members disposed at opposite sides of said attaching means and extending in overlapping relation with said skin reinforcing means at opposite sides thereof, each of said transfer members being rigidly secured to said reinforcing means, and means for securing said transfer members to said attaching member.

5. The combination in an aircraft wing of the stressed skin type of a skin blanket and an inboard end blanket attaching means, said blanket comprising a metallic skin and spanwise extending reinforcing means of substantial depth secured thereto internally of the wing, and said attaching means comprising a chordwise extending attaching member disposed adjacent the inboard end of said blanket substantially in the plane thereof, spaced metallic stress transfer members disposed at opposite sides of said attaching means and extending in overlapping relation with said skin reinforcing means at opposite sides thereof, each of said transfer members being rigidly secured to said reinforcing means, and means for securing said transfer members to said attaching member, said attaching member having longitudinally extending keying recesses in its opposite sides and said stress transfer members having laterally projecting integral key portions, each nested within the adjacent keying recess.

6. The combination in an aircraft wing of the stressed skin type of a skin blanket and an inboard end blanket attaching means, said blanket comprising a metallic skin and spanwise extending reinforcing means of substantial depth secured thereto internally of the wing, and said attaching means comprising a chordwise extending metallic attaching member disposed adjacent the inboard end of said blanket substantially in the plane thereof, spaced metallic stress transfer members disposed at opposite sides of said attaching means and extending in overlapping relation with said skin reinforcing means at opposite sides thereof, each of said transfer members being rigidly secured to said reinforcing means, and means for securing said transfer members to said attaching member, said attaching member having longitudinally extending keying recesses in its opposite sides and said stress transfer members having laterally projecting integral key portions, each nested with the adjacent keying recess, said securing means comprising bolt members extending through said transfer means and the attaching member disposed therebetween.

7. The combination in an aircraft wing of the stressed skin type of a skin blanket and an inboard end blanket attaching means, said blanket comprising a metallic skin and spanwise extending reinforcing means of substantial depth secured thereto internally of the wing and said attaching means comprising a chordwise extending metallic attaching member disposed adjacent the inboard end, of said blanket substantially in the plane thereof, spaced metallic stress transfer members disposed at opposite sides of said attaching means and extending in overlapping relation with said skin reinforcing means at opposite sides thereof, each of said transfer means being rigidly secured to said reinforcing means, and means for securing said transfer members to said attaching member, said metallic skin extending over the outer most of said transfer members and being secured thereto.

8. The combination in an aircraft wing of the stressed skin type of a skin blanket and an inboard end blanket attaching means, said blanket comprising a metallic skin and spanwise extending reinforcing means of substantial depth secured thereto internally of the wing, and said attaching means comprising a chordwise extending metallic attaching member disposed adjacent the inboard end of said blanket substantially in the plane thereof, spaced metallic stress transfer members disposed at opposite sides of said attaching means and extending in overlapping relation with said skin reinforcing means at opposite sides thereof, each transfer member being rigidly secured to said reinforcing means, and means for securing said transfer members to said attaching member, said attaching member having a plurality of attaching bolt openings extending transversely therethrough in the spanwise direction of said reinforcing means, and the outer most of said transfer members having slots theerthrough providing access to said bolt openings.

9. In an aircraft wing structure of the stressed skin type, a sheet metal skin, metallic stiffening means secured to and extending spanwise of said skin internally of the wing structure, a chordwise extending, spanwise-apertured attaching member adjacent the inboard end of said blanket and being substantially in the plane of said stiffening means, means for transferring stresses from said blanket to said attaching members in spaced substantially parallel paths, said transferring means comprising a pair of metallic plates at the inboard end of said blanket substantially coextensive chordwise with, one at each side of said stiffening means, said attaching member in overlapping relation therewith, each said plate being rigidly secured to the adjacent side of the stiffening means, and means securing said plates to said attaching member.

10. In an aircraft wing structure of the stressed skin type, a sheet metal skin, metallic stiffening means secured to and extending spanwise of said skin internally of the wing structure, a chordwise extending spanwise apertured attaching member adjacent the inboard end of said blanket and being substantially in the plane of said stiffening means, means for transferring stresses from said blanket to said attaching member in spaced substantially parallel paths, said transferring means comprising a pair of metallic plates at the inboard end of said blanket substantially coextensive chordwise with, one at each side of said stiffening means, said attaching member in overlapping relation therewith, each said plate being rigidly secured to the adjacent side of the stiffening means, and means securing said plates to said attaching member, each said plate and the adjacent side of said attaching member having interfitting tongue and groove portions extending substantially throughout the chordwise extent of said attaching member.

11. In an aircraft wing structure of the stressed skin type, a sheet metal skin, a plurality of spanwise extending metallic skin stiffening elements each having outer flange portions secured to said skin and being located internally of the wing structure, said elements also having at their inboard ends inner flange portions spaced inwardly from the outer flange portions and being generally parallel thereto, an attaching member adjacent and substantially in the plane of the inboard ends of said elements, and a pair of spaced metallic stress transfer plates, the one overlapping said outer flange portions and being secured thereto and the other overlapping said inner flange portions and being secured thereto, said attaching member being disposed between said plates, and means securing said plates to said attaching member.

12. In an aircraft wing structure of the stressed skin type, a sheet metal skin, a plurality of spanwise extending metallic skin stiffening elements each having outer flange portions secured to said skin and being located internally of the wing structure, said elements also having at their inboard ends inner flange portions spaced inwardly from the outer flange portions and being generally parallel thereto, an attaching member adjacent and substantially in the plane of the inboard ends of said elements, and a pair of spaced metallic stress transfer plates the one overlapping said outer flange portions and the other overlapping said inner flange portions, said plates being securely spot welded to said flange portions, said attaching member being disposed between said plates, and bolt means securing said plates to said attaching member.

13. In an aircraft wing structure of the stressed skin type, a sheet metal skin, a plurality of spanwise extending metallic skin stiffening elements each having outer flange portions secured to said skin and being located internally of the wing structure, said elements also having at their inboard ends inner flange portions spaced inwardly from the outer flange portions and being generally parallel thereto, an attaching member adjacent and substantially in the plane of the inboard ends of said elements, and a pair of spaced metallic stress transfer plates, the one overlapping said outer flange portions and being secured thereto and the other overlapping said inner flange portions and being secured thereto, said attaching member being disposed between said plates and having tongue and groove connections therewith, and bolt means for securing said plates to said attaching member.

14. In an aircraft wing structure of the stressed skin type, a sheet metal skin, a plurality of spanwise extending metallic skin stiffening elements each having outer flange portions secured to said skin and being located internally of the wing structure, said elements also having at their inboard ends inner flange portions spaced inwardly from the outer flange portions and being generally parallel thereto, an attaching member adjacent and substantially in the plane of the inboard ends of said elements, a pair of spaced metallic stress transfer plates, the one overlapping said outer flange portions and being secured thereto and the other overlapping said inner flange portions and being secured thereto, said attaching member being disposed between said plates, and means securing said plates to said attaching member, said attaching member having bolt apertures extending therethrough in a direction spanwise of the wing, portions of said outer flange portions being removed at the inboard ends thereof and the adjacent stress transfer plate having slots therethrough where said flange portions are removed to permit access therethrough externally of said skin to said bolt apertures.

15. In an aircraft wing structure of the stressed skin type, a sheet metal skin, a plurality of chordwise-spaced, spanwise-extending metallic skin stiffeners internally of the wing, said stiffeners being of Y-shaped cross-section, the arms thereof having opposed flanges secured to said skin, a pair of metallic reinforcing members at the inboard end of each said stiffeners and rigidly secured to the base of the stiffener, said reinforcing members having inner lateral flanges corresponding to and parallel to said first mentioned flanges, a pair of spaced metallic stress transfer plates, one overlapping and being rigidly secured to said first mentioned flanges and the other overlapping and being rigidly secured to said lateral flanges, a spanwise apertured chordwise extending attaching member disposed between said plates, and means securing said plates to said attaching member.

16. In an aircraft wing structure of the stressed skin type, a sheet metal skin, a plurality of chordwise-spaced, spanwise-extending metallic skin stiffeners internally of the wing, said stiffeners being of Y-shaped cross-section, the arms thereof having opposed flanges secured to said skin, a pair of metallic reinforcing members at the inboard end of each said stiffeners and rigidly secured to the base of the stiffener, said reinforcing members having inner lateral flanges corresponding to and parallel to said first mentioned flanges, a pair of spaced metallic stress transfer plates, one overlapping and being rigidly secured to said first mentioned flanges and the other overlapping and being rigidly secured to said lateral flanges, a spanwise apertured chordw.se extending attaching member disposed between said plates, and means securing said plates to said attaching member, one of the apertures of said attaching member having its axis disposed between a pair of said stiffening elements, at least one of the adjacent flanges of said pair of elements being removed at its inboard end, and the adjacent stress transfer plate having a slot therethrough overlying the space between said pair of elements and the space provided by the removal of the flange portion to provide access between said pair of elements to said one aperture.

17. In an aircraft wing structure of the stressed skin type, a sheet metal skin, a plurality of chordwise-spaced, spanwise-extending metallic skin stiffeners internally of the wing, said stiffeners being of Y-shaped cross-section, the arms thereof having opposed flanges secured to said skin, a pair of metallic reinforcing members at the inboard end of each said stiffeners and rigidly secured to the base of the stiffener, said reinforcing members having inner lateral flanges corresponding to and parallel to said first mentioned flanges, a pair of spaced metallic stress transfer plates, one overlapping and being rigidly secured to said first mentioned flanges and the other overlapping and being rigidly secured to said lateral flanges, a spanwise apertured chordwise extending attaching member disposed between said plates, and means securing said plates to said attaching member, one of the apertures of said attaching member having its axis disposed between a pair of said stiffening elements, at least one of the adjacent flanges of said pair of elements being removed at its inboard end, and the adjacent stress transfer plate having a slot therethrough overlying the space between said pair of elements and the space provided by the removal of the flange portion to provide access between said pair of elements to said one aperture, the one element which has the removed flange portion being provided with a reinforcing plate secured to its base portion, said last named plate being normal to the outer stress transfer plate and having a portion secured to said outer stress transfer plate to compensate for the removal of said flange portion.

18. In an aircraft wing structure of the stressed skin type, a sheet metal skin, a plurality of chordwise-spaced, spanwise-extending metallic skin stiffeners internally of the wing, said stiffeners being of Y-shaped cross-section, the arms thereof having opposed flanges secured to said skin, a pair of metallic reinforcing members at the inboard end of each said stiffeners and rigidly secured to the base of the stiffener, said reinforcing members having lateral flanges corresponding to and parallel to said first mentioned flanges, a pair of spaced metallic stress transfer plates, one overlapping and being rigidly secured to said first mentioned flanges and the other overlapping and being rigidly secured to said lateral flanges, a spanwise apertured chordwise extending attaching member disposed between said plates, and means securing said plates to said attaching member, one of the apertures of said attaching member having its axis disposed substantially in line with one of said stiffening elements, said one element having its inboard end removed for a substantial distance except for a portion of its base, said base portion being secured to the inner stress transfer plate and the outer stress transfer plate having a slot therethrough in the region of said removed portion to provide access therethrough to said one aperture.

19. In an aircraft wing structure of the stressed skin type, a sheet metal skin, a plurality of chordwise-spaced, spanwise-extending metallic skin stiffeners internally of the wing, said stiffeners being of Y-shaped cross-section, the arms thereof having opposed flanges secured to said skin, a pair of metallic reinforcing members at the inboard end of each said stiffeners and rigidly secured to the base of the stiffener, said reinforcing members having lateral flanges corresponding to and parallel to said first mentioned flanges, a pair of spaced metallic stress transfer plates, one overlapping and being rigidly secured to said first mentioned and the other overlapping and being rigidly secured to said lateral flanges, a spanwise apertured chordwise extending attaching member disposed between said plates, and means securing said plates to said attaching member, one of the apertures of said attaching member having its axis disposed substantially in line with one of said stiffening elements, said one element having its inboard end removed for a substantial distance except for a portion of its base, said base portion being secured to the inner stress transfer plate and the outer stress transfer plate having a slot therethrough in the region of said removed portion to provide access therethrough to said one aperture, said inner stress transfer plate having a reinforcing element secured thereto at the region of said base portion, said reinforcing element also being secured to the lateral flanges of said stiffener reinforcing members.

20. The combination in an airfoil of the stressed skin type of a skin blanket including a skin and reinforcing stringers of considerable depth and attaching means for an end of the blanket, said attaching means comprising a member in the plane of the blanket extending across one end of the blanket in a direction transversely of the stringers, and a pair of spaced stringer embracing generally parallel stress transfer plates secured to the skin blanket and to said end member, and means for securing the skin blanket assembly through said end member to an adjacent part.

MICHAEL WATTER.
HARRY J. SCAMMELL.